US006918683B2

(12) United States Patent
Olson

(10) Patent No.: US 6,918,683 B2
(45) Date of Patent: Jul. 19, 2005

(54) OSCILLATING LIGHT DEVICE

(76) Inventor: Karen Olson, 14 E. 13th St., Huntington Station, NY (US) 11746

( * ) Notice: Subject to any disclaimer, the term of this patent is extended or adjusted under 35 U.S.C. 154(b) by 10 days.

(21) Appl. No.: 10/418,539

(22) Filed: Apr. 18, 2003

(65) Prior Publication Data

US 2003/0202352 A1 Oct. 30, 2003

Related U.S. Application Data

(60) Provisional application No. 60/376,428, filed on Apr. 29, 2002.

(51) Int. Cl.[7] .............................................. F21V 21/28

(52) U.S. Cl. ...................... 362/272; 362/275; 362/276; 362/386

(58) Field of Search ................................ 362/269, 271, 362/272, 275, 276, 286, 287, 386, 427, 428

(56) References Cited

U.S. PATENT DOCUMENTS 1,697,242 A 1/1929 Hill
1,756,531 A 4/1930 Aldeen et al.
2,132,302 A * 10/1938 Kennelly .................... 362/286
2,191,049 A 2/1940 Tornblom
2,784,388 A * 3/1957 King et al. ................ 362/272
4,074,125 A 2/1978 Casalou
4,308,911 A 1/1982 Mandl
4,769,746 A * 9/1988 Sumlin ...................... 362/505
5,142,457 A * 8/1992 Wehner ..................... 362/286
5,142,467 A * 8/1992 Yuen ......................... 362/399
5,282,118 A * 1/1994 Lee ........................... 362/276
5,481,441 A 1/1996 Stevens
5,640,141 A 6/1997 Myllymaki
5,673,989 A 10/1997 Gohl et al.
6,161,319 A 12/2000 Rink et al.
6,249,225 B1 6/2001 Wang
6,353,428 B1 3/2002 Maggioni et al.

OTHER PUBLICATIONS

Photographs (3) of lamp•base model OS–Base, distributed by American DJ Supp: (www.americandj.com).

* cited by examiner

*Primary Examiner*—Y My Quach Lee
(74) *Attorney, Agent, or Firm*—Dilworth & Barrese, LLP

(57) ABSTRACT

A floodlight configured to illuminate a controlled area includes a planar linkage assembly providing the lamp head of the floodlight with smooth oscillatory motion.

13 Claims, 3 Drawing Sheets

10
12
14
38
48
46
56

12
26
32
18
16
20
C
C
34
D
52
B
B
A
A
58
D
54
38'
14

A
50
14
48
38'

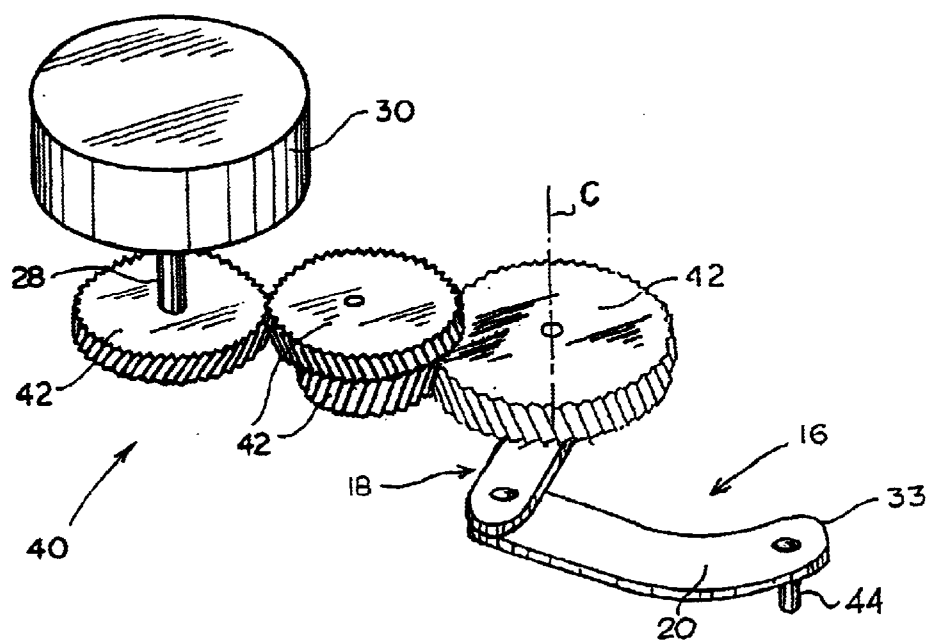
F I G. 3
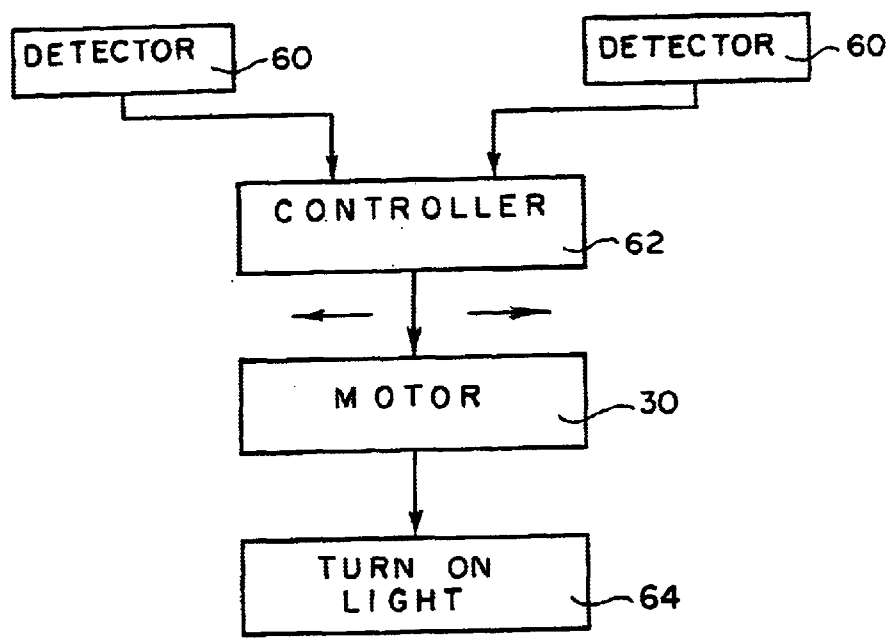
F I G. 4

OSCILLATING LIGHT DEVICE

CROSS-REFERENCE TO RELATED APPLICATION

This application is based on and claims priority to U.S. Provisional Patent Application 60/376,428 filed on Apr. 29, 2002 and fully incorporated herein by reference.

BACKGROUND OF THE INVENTION

1. Field of the Invention

The present invention relates to a floodlight, which is used for home security purposes, or in security industries for protecting commercial properties. More particularly, the present invention relates to an oscillating floodlight or spotlight configured to automatically throw a light in a desired direction to monitor a certain area in response to the detection of motion.

2. Description of the Related Art

It is often necessary to flash and to change the direction of a light for monitoring a certain area in order to prohibit unauthorized persons from entering restricted areas. Devices that are used to monitor an unauthorized person typically include a floodlight or a spotlight. More specifically, the light devices heretofore devised and utilized for the purpose of surveillance or for lighting areas for safety reasons include spot or floodlights mounted to a building, or on a pole, or on a grounded support.

For Example, U.S. Pat. No. 2,191,049 is directed to an automobile spotlight comprising a lamp head mounted on one end of a tubular stem, which is coupled to a hollow shaft rotating the lamp head. Mechanically, the structure is not simple and requires periodic maintenance.

Furthermore, once energized, the lamp head oscillates continuously in accordance with a rather predictable pattern. While continuous oscillation of the lamp is certainly convenient in use, unfortunately, in the context of surveillance, it also allows intruders plenty of time to avoid the floodlight.

It is, therefore, desirable to have a floodlight reliable in use, easily maintainable and capable of controllably turning on in response to the detection of a movable object.

SUMMARY OF THE INVENTION

The present invention attains the above-stated objective with a planar linkage assembly coupling an actuator of a floodlight to a lamp head for smooth oscillatory motion of the latter in response to energization of the actuator. The planar linkage provides the structure of the oscillating floodlight with desirable compactness, enhances its dynamic characteristics and offers a simple and easily maintainable mechanism.

Selective actuation of the floodlight in response to detection of a moving object is realized by coupling at least one motion detector with the actuator operative to controllably displace the floodlight in a desired direction. Accordingly, the floodlight of the present invention offers the element of surprise for anybody or anything entering the area controlled by the floodlight.

In accordance with another inventive aspect, the structure of the floodlight allows its lamp head to pivot in a vertical direction in addition to a horizontal oscillation. Vertical displacement can be realized either manually or, preferably, automatically by providing the inventive structure with an additional actuator displacing the floodlight in a vertical direction.

It is therefore an object of the invention to provide a floodlight having a simple and easily maintainable structure.

Another object of the invention is to provide a floodlight capable of moving in mutually perpendicular planes.

Still another object of the invention is to provide a floodlight operative to controllably generate a light and to move in a desired direction in response to a control signal indicating the presence of a moving object.

BRIEF DESCRIPTION OF THE DRAWINGS

The above objects and other advantages of the present invention will become more apparent from the following specific description illustrated by the accompanying drawings, in which:

FIG. 3 is a perspective view of a motion-translating assembly providing displacement of the floodlight in response to energization of an actuator; and FIG. 4 is a flow chart illustrating the operation of the floodlight of FIG. 1 in a control mode, wherein light generation occurs in response to detection of a moving object.

SPECIFIC DESCRIPTION

Figure 1:
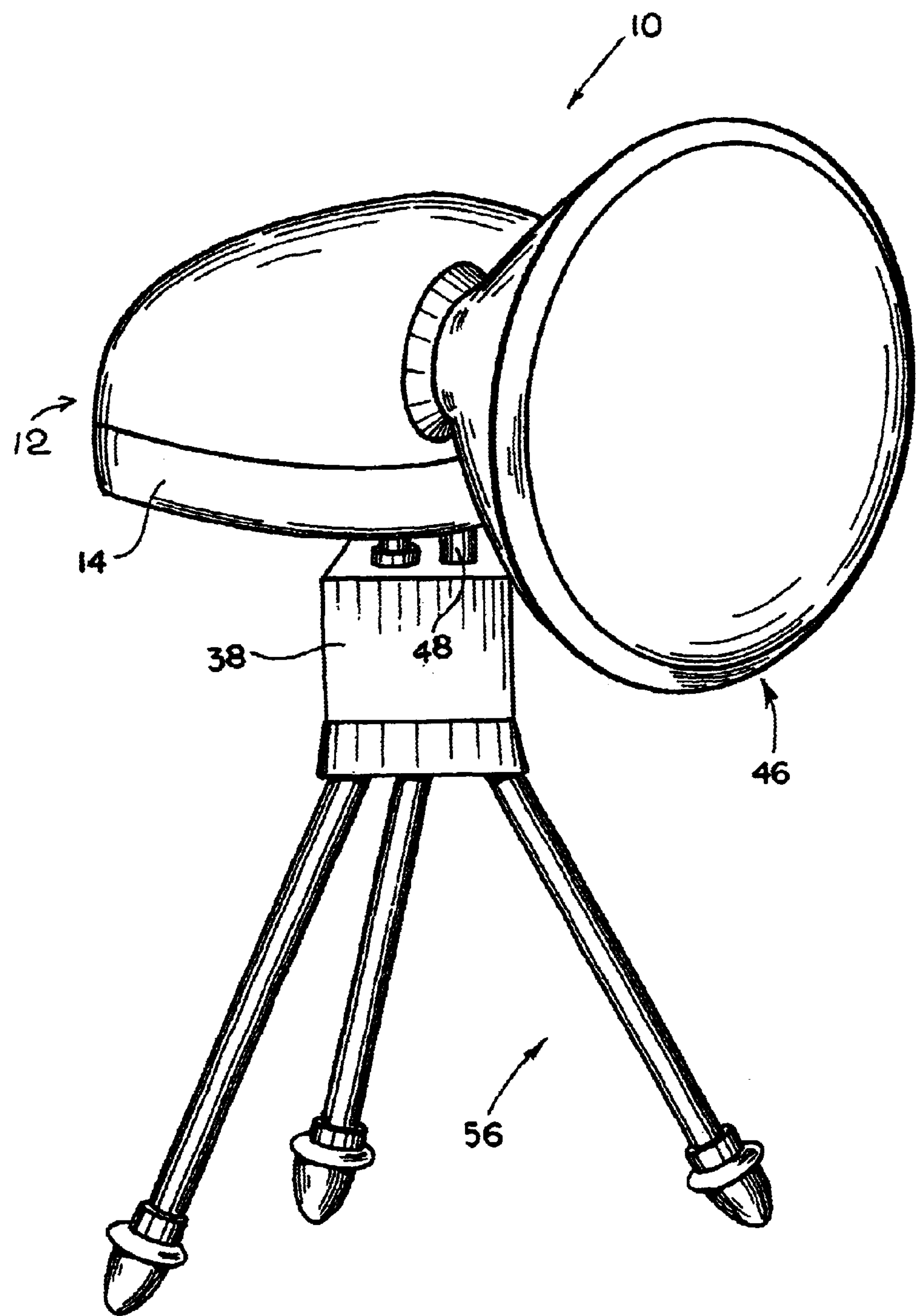
FIG. 1 illustrates a perspective view of a floodlight configured in accordance with the present invention.

In the following description, like reference numerals identify similar or identical elements throughout the several views, while well-known functions or constructions are not described in detail so as not to obscure the invention in unnecessary detail.

Figures 2, 2A:
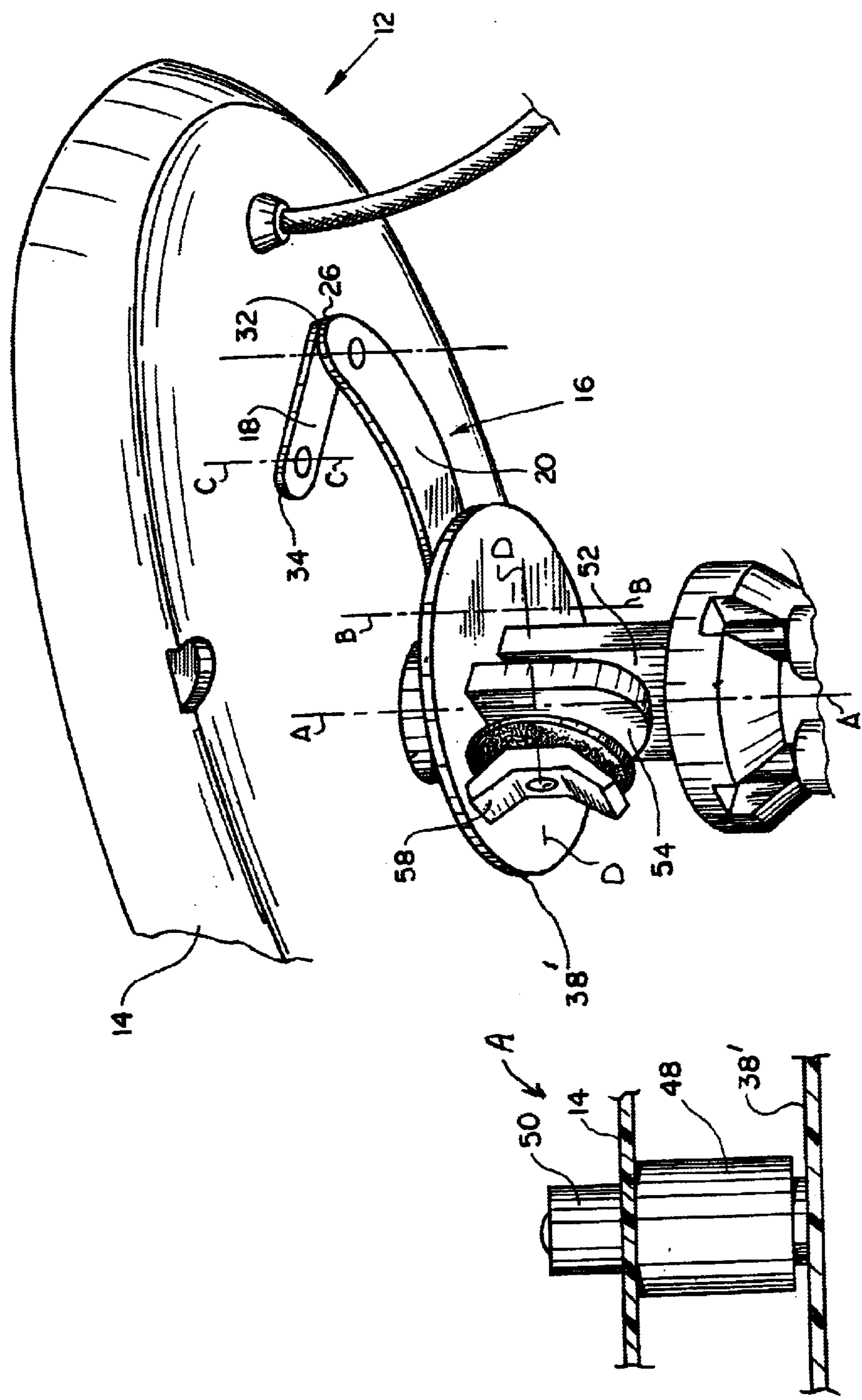
FIG. 2 illustrates a planar linkage assembly provided on the bottom of the floodlight's head.
FIG. 2A is a sectional view of a detail A seen in FIG. 2.

Referring to FIGS. 1–3, a floodlight 10 configured in accordance with the invention features a planar linkage assembly 16 (FIG. 2) providing a smooth oscillatory movement of a lamp head 12 about a vertical axis A—A. Mobility of the linkage assembly 16 is determined by a leading link 18 rotatable along a circular path about a vertical axis C—C parallel to, but spaced from the axis A—A and coupled to a trailing link 20. Shapes and dimensions of the leading and trailing links 18, 20 can vary subject only to smooth and efficient translation of rotary motion of a motor shaft 28 (FIG. 3) into oscillatory motion of the lamp head 12 about the axis A—A.

As shown in FIGS. 2 and 3, preferably, the leading link 18 is straight and relatively short, as compared to the trailing link 20, and has its free end 32 attached to the free end 26 of the trailing link 20, which, in turn, moves relative to its anchored end 33 (FIG. 3). Once a motor 30 is energized, a gear train 40, coupled to the motor shaft 28, translates the motion of the motor shaft 28 into the unidirectional rotation of an anchored end 34 of the leading link 18. Rotation of the anchored end 34 causes the free ends 32 and 26 of the leading 18 and trailing 20 links, respectively, run along a common circular path. The gear train 40 may include a plurality of meshing toothed wheels 42 or, alternatively, it may include differently dimensioned grooved wheels guiding a cable system (not shown), which is operatively coupled to the motor shaft 28. Preferably, the motor 30 is an AC motor; however, DC motors can be used as well.

To provide the lamp head 12 with oscillatory motion, the curved and relatively long trailing link 20 is provided with the anchored end 33 pivotally mounted on a pin 44 as the free end 26 of the trailing link 20 rotates along with the free end 32 of the leading link 18. Dynamically, since the floodlight 10 is configured to have three spaced apart supporting locations defined by parallel axes A—A, B—B, which extends along the pin 44, and C—C, the housing 14 smoothly moves in opposite angular directions every time the free end 32 of leading link 18 completes a 180° displacement.

The gear train 40 is selected in accordance with local needs and may function, for example, as a reduction gear. However, specific requirements and characteristics of the motor 30 used in each concrete situation dictate the selection of the gear type. To allow the leading link 18 not to be impeded by the trailing link 20, when the links are juxtaposed with one another during their mutual displacement, a spacer (not shown) is mounted between the free ends 26 and 32 of the links.

A housing 14 of the lamp head 12 is a molded structure and may include detachably connected top and bottom portions, which define therebetween a space receiving the gear train 40, the motor 30 and a bulb assembly 46. The housing is sealed to allow the floodlight 10 to be used outdoors. The bottom of the housing 14, besides the planar linkage assembly 16, is integrally or detachably formed with a sleeve 48 surrounding a rod 50, which is fixed to the support 38 and centered on the axis A—A, as better shown in FIG. 2A. During the oscillation of the lamp head 12 along a 180° angular path, the rod 50 extending into the housing 14 is configured to allow the sleeve 48 and the lamp head 12 to oscillate relative to the support 38. Accordingly, the lamp head 12 has its mass directly supported on the rod 50 and the anchored end 34 of the leading link 18 and indirectly on the free ends of the links and the anchored end 33 of the trailing link to provide the floodlight with a well-balanced structure.

The support 38 shown in FIG. 1 only diagrammatically and in detail in FIG. 2. includes a plate 38', which is coupled to the rod 50, and a lug 54 fixed to the plate 38' and extending axially away from the rod 50. The plate 38' supports the pin 44 so that either the housing 14 is capable of oscillating relative to the support 38, provided that the latter is displaceably fixed, or the support 38 oscillates relative to the housing 14, if the latter is prevented from displacement. Typically, the support 38 is fixed to an immovable tripod 56 to allow the lame head 12 to oscillate horizontally. Attachment of the support 38 to the tripod 56 is realized by removably coupling the lug 54 to a lug 52, which is fixed to the tripod 56, by a lug nut 58 centered along an axis D–D (FIG. 2). When coupled, the lugs 52 and 54 are so arranged that the axis A—A, about which the lamp head 12 oscillates, forms an axis of symmetry for the tripod 56, adding thus stability to the entire floodlight 10 in a fully assembled state thereof.

The support 38 may be configured so as to house an actuator (not shown), providing the lamp head 12 with vertical oscillation. Instead of the tripod 56, any other structure can be used as a base configured to be detachably coupled to the lamp head 12.

Turning to FIG. 4, the floodlight 10 can be modified to enable selective energization of the bulb assembly 46 in response to detecting a moving object. In practice, one or more infrared motion detectors 60, strategically positioned along the perimeter of an area controlled by the floodlight or directly on the spotlight 10, is operative to generate a signal upon detecting a moving object. A controller 62 located either directly within the housing 14 or at a remote location is coupled to the bulb assembly 46, which, unless powered by the controller in response to the received signal, is turned off. In accordance with one aspect of the invention, the energization of the bulb assembly occurs during the continuous oscillation of the motor 30. Alternatively, the motor 30 can be powered by the controller 62 only upon receiving a signal from one of the detectors 60 to rotate the motor shaft 28 in one of the opposite angular directions depending on the position of the detector 60 that has generated the signal. While the motor shaft 28 rotates in a direction and at an angle determined by the controller 62, the bulb assembly 46 is turned on to illuminate the desired segment of the controlled area, as denoted by box 64. Displacement of the motor shaft 28 can be stopped as the lamp head 12 has reached the desired segment of the controlled area. In case if multiple signals were generated substantially at the same time, the controller 62 would establish the hierarchy of commands enabling the lamp to move in accordance with a criterion established during the design stage of the floodlight 10.

Although the invention has been described in its preferred form with a certain degree of particularity, variations and modifications may be made therefrom within the scope of the invention without departing from the principles of the invention and without sacrificing its chief advantages.

What is claimed is:

1. A floodlight comprising:

a lamp head provided with:

a housing having a bottom, and a support coupled to the housing; and a planar linkage assembly including leading and trailing links juxtaposed with an outer surface of the bottom of the housing and having anchored ends, which are rotatably mounted to the housing and to the support, respectively, and free ends coupled to one another and displaceable relative to the anchored ends so as to provide the lamp head and the support with the oscillatory motion relative to one another about a pivot axis.

2. The floodlight of claim 1, wherein the leading link of the planar linkage assembly is substantially straight and rotates about a first axis of rotation, extending through the anchored end thereof parallel to the pivot axis of the lamp head, so that during a single revolution of the leading link the lamp head displaces in opposite angular directions relative to the support.

3. The floodlight of claim 2, wherein the free end of the trailing link of the planar linkage assembly is displaceably fixed to the free end of the leading link while the anchored end of the trailing link pivots about a second axis of rotation extending parallel to the pivot axis of the lamp head, wherein the first, second and pivot axes of the leading link, the trailing link and the lamp head, respectively, are spaced apart to provide the balanced oscillatory motion of the lamp head relative to the support.

4. The floodlight of claim 3, further comprising an actuator housed in the lamp head and enabling rotation of the leading link of the planar linkage assembly about the anchored end thereof.

5. The floodlight of claim 4, wherein the actuator includes a motor and a motor shaft, the floodlight further comprising a gear assembly mounted in the lamp head and configured to provide a desired gear ratio between the motor shaft and the leading link of the planar linkage assembly.

6. The floodlight of claim 5, wherein the gear assembly includes a plurality of toothed wheels, one of the toothed wheels meshing with the motor shaft of the actuator, and another toothed wheel operatively engaging the one toothed wheel and being coupled to the anchored end of the leading link.

7. The floodlight of claim 1, further comprising a bulb assembly mounted to the housing of the lamp head and oscillating therewith.

8. The floodlight of claim 1, further comprising an additional actuator coupled to the support and operative to pivot the lamp head about a respective axis perpendicular to the pivot axis of the lamp head.

9. The floodlight of claim 1, wherein the lamp head is provided with a sleeve extending from the bottom of the housing of the lamp head toward the support and centered on a rod extending through the sleeve along the pivot axis and fixed to the support, the rod being operatively connected to the lamp head and shaped to allow the sleeve and the lamp head to oscillate about the pivot axis relative to the support.

10. The floodlight of claim 9, wherein the support has a first lug extending in an axial direction opposite to the rod, the floodlight further comprising a tripod having a second lug, which is detachably attached to the first lug, whereas the first and second lugs are displaceable relative to one another to provide the lamp head with displacement about a respective axis extending perpendicular to the pivot axis.

11. The floodlight of claim 7, further comprising a controller coupled to the bulb assembly, and at least one motion detector configured to generate a signal upon detecting a moving object and coupled to the controller so that the controller selectively powers the bulb assembly in response to the signal from the at least one motion detector.

12. The floodlight of claim 11, wherein the at least one motion detector is mounted to the lamp head or spaced therefrom.

13. A floodlight comprising:

a lamp head;

an actuator housed in the lamp head and operative to be energized;

a support operatively connected to the lamp head;

a planar linkage assembly coupled to the actuator and to the support and operative to oscillate the lamp head relative to the support upon energizing the actuator;

a bulb assembly mounted to the lamp head;

at least one motion detector operative to generate a signal in response to detecting a moving object; and a controller coupled to the actuator and the bulb assembly and operative to selectively energize the actuator in response to the signal from the at least one motion detector, the controller being operative to power the bulb assembly simultaneously with or subsequently to the energization of the actuator.

* * * * *